US008808042B1

(12) United States Patent
Hewitt

(10) Patent No.: US 8,808,042 B1
(45) Date of Patent: Aug. 19, 2014

(54) AMPHIBIOUS VEHICLE DRIVE SYSTEM

(71) Applicant: Stanley C. Hewitt, Ketchikan, AK (US)

(72) Inventor: Stanley C. Hewitt, Ketchikan, AK (US)

( * ) Notice: Subject to any disclaimer, the term of this patent is extended or adjusted under 35 U.S.C. 154(b) by 0 days.

(21) Appl. No.: 13/932,483

(22) Filed: Jul. 1, 2013

(51) Int. Cl.
*B60F 3/00* (2006.01)
*B63H 11/00* (2006.01)
*B63H 23/02* (2006.01)
*B63H 23/30* (2006.01)

(52) U.S. Cl.
CPC .................................. *B60F 3/0015* (2013.01)
USPC ................. 440/12.51; 440/12.52; 440/12.63; 440/38; 440/75

(58) Field of Classification Search
CPC ......... B60F 3/00; B60F 3/0007; B60F 3/0015
USPC .................... 440/12.5–12.64, 38, 75
See application file for complete search history.

(56) References Cited

U.S. PATENT DOCUMENTS

| | | | | |
|---|---|---|---|---|
| 3,486,477 A | * | 12/1969 | Pender | 440/12.53 |
| 4,712,636 A | * | 12/1987 | Ishimatsu | 180/198 |
| 6,764,358 B2 | * | 7/2004 | Gibbs | 440/12.5 |
| 6,821,166 B2 | * | 11/2004 | Roycroft et al. | 440/12.51 |
| 6,921,304 B2 | | 7/2005 | Hewitt | |
| 7,011,557 B2 | * | 3/2006 | Gibbs | 440/12.51 |
| 7,410,396 B2 | * | 8/2008 | Longdill et al. | 440/12.54 |
| 7,950,973 B2 | | 5/2011 | Hewitt | |

* cited by examiner

*Primary Examiner* — Ajay Vasudeva
(74) *Attorney, Agent, or Firm* — William M. Hobby, III

(57) ABSTRACT

This invention relates to an amphibious vehicle and especially to an amphibious vehicle having twin internal combustion engines propelling the vehicle in water with a pair of water jet drives and propelling the vehicle on land with one of the same engines having an automatic transmission controlling a pair of track assemblies with a pair of planetary gears, clutches and disc brakes.

14 Claims, 2 Drawing Sheets

AMPHIBIOUS VEHICLE DRIVE SYSTEM

FIELD OF THE INVENTION

This invention is related to an amphibious vehicle and especially to an amphibious vehicle having twin internal combustion engines propelling the vehicle in water with a pair of water jet drives and propelling the vehicle on land with one of the same engines having an automatic transmission controlling a pair of track assemblies.

BACKGROUND OF THE INVENTION

An amphibious vehicle is a motorized vehicle capable of travel on land as well as in the water. Such vehicles are known and are capable of providing transportation either in water or on land and are useful in areas where there are bodies of water, such as lakes, rivers, swamps, and the like, which need to be traversed. The amphibious vehicle allows its operator to travel across land and upon reaching the edge of a body of water, proceed into the water and continue on.

Many amphibious vehicles use a drive assembly, typically an assembly of wheels or caterpillar tracks that are fixed in position and cannot be retracted from the water during marine operation. The inability to remove the driving assembly from the water when the vehicle is traveling in the water means the amphibious vehicle cannot be operated at a high speed in the water because of the high drag caused by the submerged driving assembly. Maneuverability in the water is also compromised by the additional drag.

In my prior U.S. Pat. No. 7,950,973 for an Amphibious Vehicle, I show an improved amphibious vehicle which allows the track assemblies to be rotated between a lower position supporting the amphibious vehicle on land while providing propulsion to the vehicle on land and a raised position where the tracks rest vertically above the hull's deck during marine operation. With the caterpillar track assemblies fully removed from the water, the vehicle's performance and maneuverability are improved. The track assemblies are hydraulically driven to rotate the wheels and tracks between a lowered and a raised position. The present application is an improved drive system for the vehicle in this prior U.S. Patent and the contents of this earlier patent is incorporated herein by reference in its entirety.

In my prior U.S. Pat. No. 6,921,304 for an Amphibious Vehicle, I show an earlier improved amphibious vehicle which allows the track assemblies to be rotated between raised and lowered positions. In this prior patent the tracks are raised and lowered by a lifting mechanism which lifts the tracks and then pulls the tracks inward toward the hull of the vehicle using hydraulic rams. The lifting and pulling lifts the tracks into a fully upright position onto the hull to reduce the overall width of the amphibious vehicle to facilitate trailering.

The present invention is for an improved drive system for the amphibious vehicle as shown in my prior U.S. Patent and propels the vehicle in the water with a pair of water jet drives and propels the vehicle on land with a pair of track assemblies using an automatic transmission while using the same engine for both land and on water using a power transfer system from the output shaft of one of the engines.

SUMMARY OF THE INVENTION

This invention relates to an amphibious vehicle and amphibious vehicle drive system having a vehicle hull with a pair of track drive assemblies and a pair of water jet drives. A pair of diesel internal combustion engines are mounted in the hull, each having an output shaft. A marine transmission couples each internal combustion engine output shaft to one of the water jet drives. An automatic transmission, which may be a standard automobile automatic transmission, is driven by a power takeoff from one of the engines output shafts. The automatic transmission is coupled to a differential having a pair of track drive shafts operatively coupled to a pair of track drive assemblies. Each track drive shaft has an air clutch therein for selectively clutching one or the other track drive shafts and coupled track assembly. Each track drive shaft has a planetary gear therein for selectively changing the torque applied to each track assembly. An amphibious vehicle drive system is thus powered by a pair of internal combustion engines driving a pair of water jet drives in the water and for driving the vehicle on land with an automatic transmission driving a pair of track assemblies.

BRIEF DESCRIPTION OF THE DRAWINGS

The accompanying drawings, which are included to provide further understanding of the invention are incorporated in and constitute a part of the specification, and illustrate an embodiment of the invention and together with the description serve to explain the principles of the invention.

In the drawings.

DETAILED DESCRIPTION OF EXEMPLARY EMBODIMENT

Figure 1:
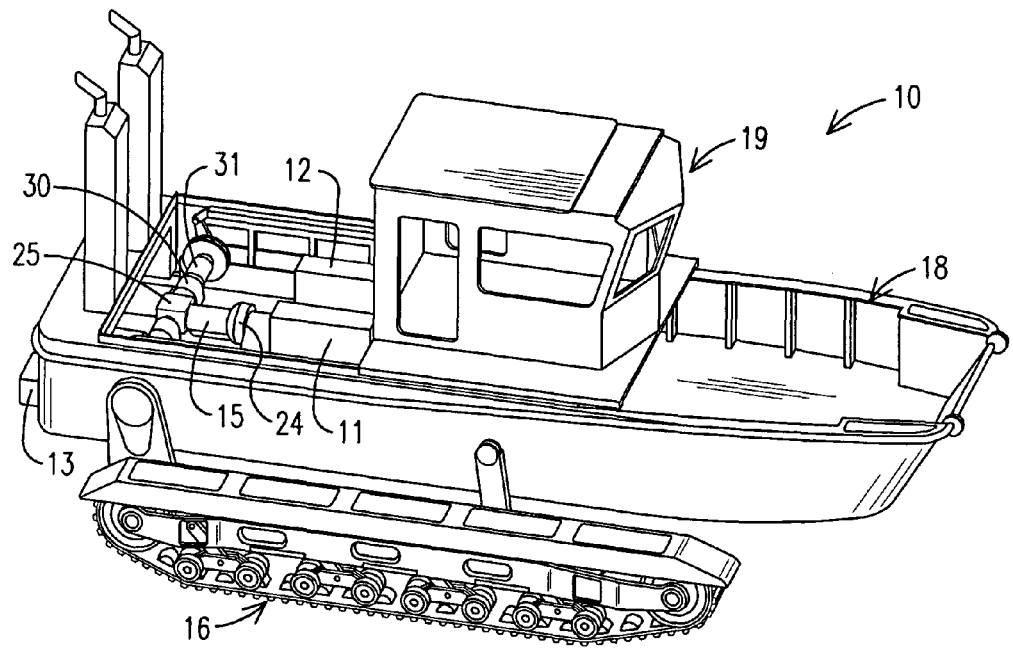
FIG. 1 is a perspective view of an amphibious vehicle having a drive train in accordance with the present invention.
Figure 3:
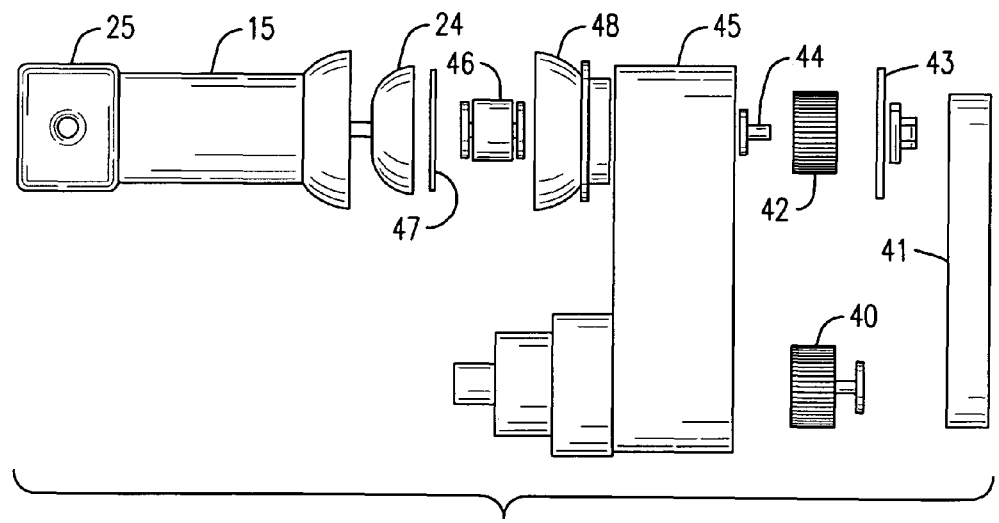
FIG. 3 is an exploded elevation of the power takeoff and transfer case for the amphibious vehicle of FIGS. 1 and 2.
Figure 2:
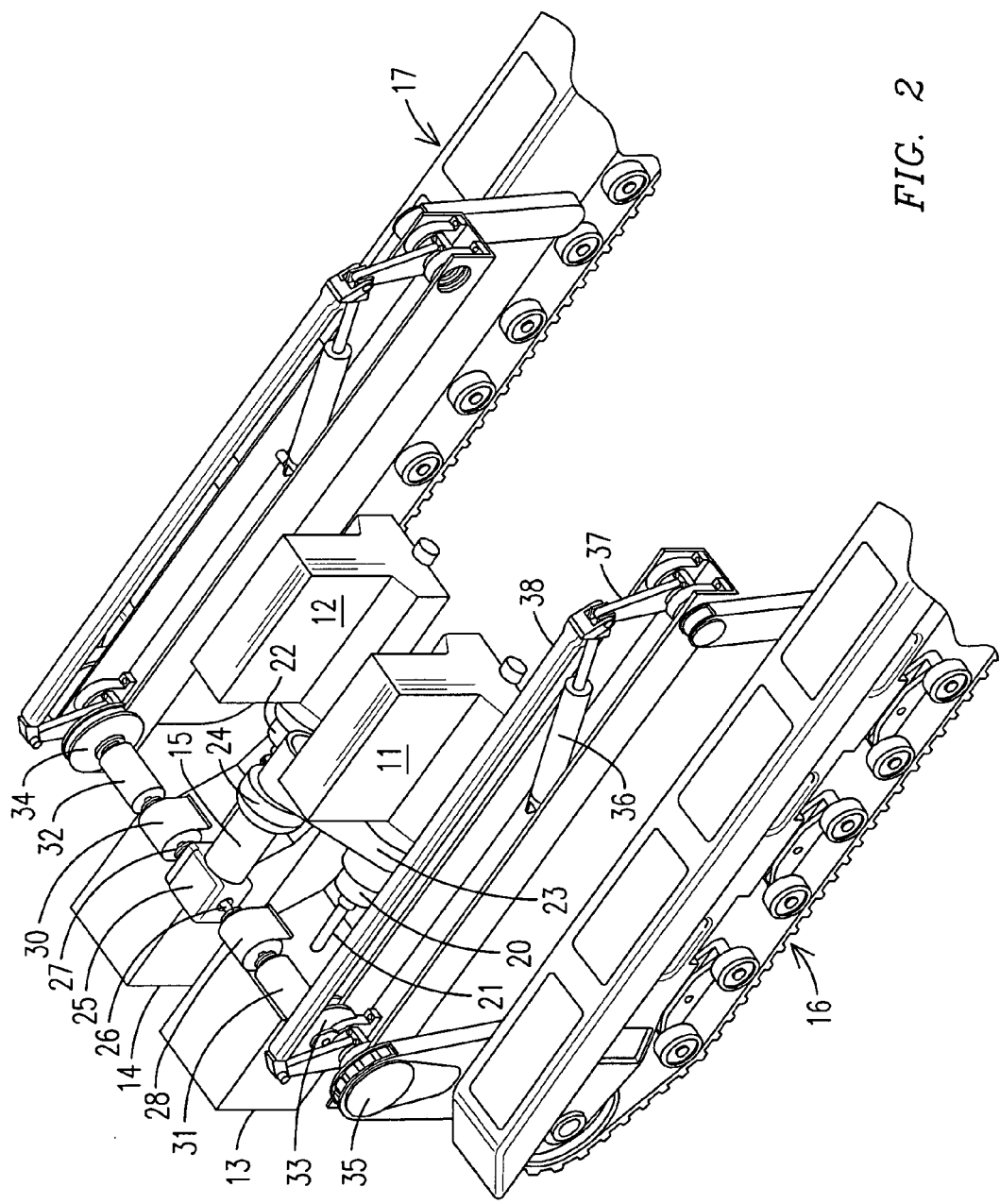
FIG. 2 is a partial perspective view of the amphibious vehicle of FIG. 1.

As seen in FIGS. 1-3 of the drawings, this invention is related to an amphibious vehicle 10 and especially to an amphibious vehicle having twin internal combustion engines 11 and 12, such as two 300 hp diesel engines, propelling the vehicle in water with a pair of water jet drives 13 and 14 and propelling the vehicle 10 on land with one of the same engines having an automatic transmission 15 controlling a pair of track assemblies 16 and 17.

In FIGS. 1 and 2, the amphibious vehicle 10 has a hull 18, such as a 32 foot long hull, having a cabin 19 thereon and has track drive assemblies 16 and 17 mounted on either side of the hull 18. The track assemblies 16 and 17 are arranged so that the tracks can be rotated between a lowered position as shown in FIGS. 1 and 2 and a raised position where they can rest above the water level during marine operations in accordance with my prior U.S. Patents.

The drive system of the present invention, as more clearly seen in connection with FIGS. 1 and 2, having a pair of diesel engines 11 and 12 powering a pair of water jet drives 13 and 14. Engine 11 has a marine transmission 20 coupled to the output of the engine. The marine transmission 20 output shaft 21 is coupled to the water jet drive 13. Engine 12 has a marine transmission 22 coupled to the water jet drive 14. The water jet drives 13 and 14 propel the amphibious vehicle 10 when traveling in water with the track assemblies 16 and 17 in a raised position. Amphibious vehicle engine 11 has a power takeoff 23 in a transfer case 23 coupled to the output of the output shaft of engine 11 and to the input shaft of a torque converter 24 and to an automatic transmission 15. The automatic transmission 15 is a standard six speed automobile automatic transmission coupled to the output of the diesel engine 11 through the power takeoff 23.

The output shaft of the automatic transmission 15 is coupled to a differential 25 driving a pair of drive shafts 26 and 27. Each drive shaft 26 and 27 has an air clutch 28 and 30 therein which can be selectively actuated when steering the amphibious vehicle 10 on land. The steering of a track vehicle is conventionally done by braking one or the other of the track assemblies, forcing the non-braked track assembly to turn the vehicle. To accomplish this however requires that the track assembly being braked also be clutched at the same time. Drive shaft 27 has a planetary gear 31 therein while drive shaft 28 has a planetary gear 32 therein. The planetary gears 31 and 32 may be selectively actuated to change the gear ratio, such as 2.7:1, in the drive shafts to change the torque output to each track assembly. This arrangement gives the vehicle a 120 to 1 gear reduction in the transmission's low gear with the planetary gears engaged and a 32 to 1 with the planetary gears in direct drive. Drive shaft 26 is coupled through disc brake 33 while drive shaft 27 is coupled through a disc brake 34, which disc brakes are used in selectively braking the track assemblies 16 and 17 to brake and steer the amphibious vehicle 10. Each drive shaft 26 and 27 is coupled to a track assembly by a sprocket driving a chain 35. In FIG. 2, hydraulic rams 36 can be seen driving a bell crank 37 and linkage 38 which raise and lower the track assemblies 16 and 17.

FIG. 3 is an exploded view of the power takeoff 23 in a transfer case which is coupled to the torque converter 24 and to the automatic transmission 15. The transmission 15 is connected to the differential 25. The output of the diesel engine 11 drives a belt pulley 40 which drives a belt 41 to drive the belt pulley 42. A bearing plate 43 connects the belt pulley 42 to the belt pulley drive 44. The belt 41 and pulleys 40 and 42 are encased in a transfer casing 45. The belt 41 transfers power from the output shaft of engine 11 to the torque converter 24 through a torque converter bearing and flex plate housed in a bell housing 48.

In operation in water, the track assemblies 16 and 17 are in a raised position and the marine transmissions 20 and 22 are engaged to have the engines 11 and 12 drive the water jet drives 13 and 14 to propel the amphibious vehicle 10 across the water. On land, the track assemblies 16 and 17 are lowered and the automatic transmission 15 engaged from idle to drive. The transmission 15 is being powered by engine 11 through the power takeoff 23 and remains in idle when the tracks 16 and 17 are raised. When in gear, the transmission 15 drives the differential 25 and both drive shafts 26 and 27 through the different gear ratios of the automatic transmission 15. The amphibious vehicle 10 is driven and steered by the activation of the air clutches 28 and 30 and the disc brakes 33 and 34. The planetary gears 31 and 32 can gear down each shaft 26 or 27 and thereby increase the torque to each track assembly 16 or 17 separately.

It should be clear at this time that an amphibious vehicle and amphibious vehicle drive system have been provided. However the present invention is not to be considered limited to the forms shown which are to be considered illustrative rather than restrictive.

I claim:

1. An amphibious vehicle drive system comprising:
   a vehicle hull having a pair of track drive assemblies and at least one water jet drive;
   at least one internal combustion engine mounted in said hull and having an output shaft therefrom;
   a marine transmission coupling said internal combustion engine output shaft to said water jet drive;
   an automatic transmission;
   a transfer case coupling said output shaft to said automatic transmission;
   a differential coupling said automatic transmission to a pair of track drive shafts, each track drive shaft being operatively coupled to one of said pair of track drive assemblies;
   a pair of clutches, each clutch located in one of said pair of track drive shafts for selectively clutching one or the other track drive shafts and coupled track assembly; and
   a planetary gear mounted in each track drive shaft for selectively changing the torque in each track drive shaft and track assembly;
   whereby said amphibious vehicle drive system is powered by said at least one internal combustion engine selectively driving said at least one water jet drive and the automatic transmission driving the pair of track assemblies.

2. The amphibious vehicle drive system in accordance with claim 1 in which each of said pair of clutches is an air clutch individually controlled.

3. The amphibious vehicle drive system in accordance with claim 2 including a pair of disc brakes each being operatively coupled to one of said pair of track drive shafts.

4. The amphibious vehicle drive system in accordance with claim 3 having a chain drive for each track drive assembly driven by one said track drive shaft.

5. The amphibious vehicle drive system in accordance with claim 1 in which each said chain drive includes a sprocket attached to said track drive shaft having a chain thereon for driving said track drive assembly.

6. The amphibious vehicle drive system in accordance with claim 5 wherein said at least one internal combustion engine includes a pair of internal combustion engines each driving a water jet drive.

7. The amphibious vehicle drive system in accordance with claim 6 in which each said combustion engine is a diesel engine.

8. The amphibious vehicle drive system in accordance with claim 5 in which said automatic transmission includes a torque converter.

9. The amphibious vehicle drive system in accordance with claim 5 in which said transfer case includes an engine output shaft pulley coupled to said engine output shaft and transmission drive pulley coupled to said torque converter, and a belt coupled between said engine output shaft pulley and said transmission drive pulley.

10. An amphibious vehicle drive system comprising:
    a vehicle hull having a pair of track drive assemblies and two water jet drives;
    two internal combustion engines mounted in said hull, each having an output shaft therefrom;
    a marine transmission coupling to each said internal combustion engine output shaft to said water jet drive;
    an automatic transmission;
    a transfer case coupling the output shaft of one of said internal combustion engines to said automatic transmission;
    a differential coupling said automatic transmission to a pair of track drive shafts, each track drive shaft being operatively coupled to one of said pair of track drive assemblies;
    a pair of clutches, each clutch located in one of said pair of track drive shafts for selectively clutching one or the other track drive shafts and coupled track assembly; and
    a planetary gear mounted in each track drive shaft for selectively changing the torque in each track drive shaft and track drive assembly;
    whereby said amphibious vehicle drive system is powered by the two internal combustion engines driving the two water jet drives and the automatic transmission driving the pair of track assemblies.

11. The amphibious vehicle drive system in accordance with claim 10 in which said two internal combustion engines are diesel engines.

12. The amphibious vehicle drive system in accordance with claim 11 in which each of said pair of clutches is an air clutch individually controlled.

13. The amphibious vehicle drive system in accordance with claim 12 including a pair of disc brakes each disc brake being operatively coupled to one of said pair of track drive shafts for braking each said track assembly.

14. The amphibious vehicle drive system in accordance with claim 13 in which said transfer case includes an engine output shaft pulley coupled to said engine output shaft and a transmission drive pulley coupled to said torque converter, and a belt coupled between said engine output shaft pulley and said transmission drive pulley for driving said automatic transmission from one engine output shaft.

* * * * *